(12) United States Patent
Hong

(10) Patent No.: US 6,968,932 B2
(45) Date of Patent: Nov. 29, 2005

(54) APPARATUS FOR DAMPING VIBRATIONS

(75) Inventor: Soon-Jae Hong, Hwaseong (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/331,231

(22) Filed: Dec. 30, 2002

(65) Prior Publication Data
US 2003/0192757 A1    Oct. 16, 2003

(30) Foreign Application Priority Data
Apr. 12, 2002  (KR) ............ 2002-0020022

(51) Int. Cl.⁷ ............................. F16F 7/10
(52) U.S. Cl. .................. 188/378; 464/68; 74/574
(58) Field of Search ................. 188/378, 379, 188/380; 464/64, 66, 68; 74/572, 573 R, 74/574; 192/205, 212; 123/192.1, 192.2

(56) References Cited

U.S. PATENT DOCUMENTS 4,904,225 A * 2/1990 Worner et al. ............. 464/67
6,602,140 B2 * 8/2003 Jee ........................... 464/68

FOREIGN PATENT DOCUMENTS

| DE | 3723015 | | 1/1989 |
| EP | 1046834 A2 | * | 10/2000 |
| KR | 10-1998-0080633 | | 11/1998 |
| KR | 2002-729996 A | * | 6/2002 |
| KR | 2002-737970 A | * | 6/2002 |

* cited by examiner

Primary Examiner—Pam Rodriguez
(74) Attorney, Agent, or Firm—Morgan Lewis & Bockius LLP

(57) ABSTRACT

The dual mass flywheel reduces torsional vibrations by being mounted between the engine and the transmission. The dual mass flywheel includes a primary mass configured to couple to a crankshaft, and a first drive plate coupled to the primary mass by disposing a main elastic member therebetween. A pair of second drive plates are coupled to the first drive plate by disposing an idle elastic member therebetween. A secondary mass is fixedly coupled to the pair of second drive plates.

9 Claims, 7 Drawing Sheets

APPARATUS FOR DAMPING VIBRATIONS

FIELD OF THE INVENTION

The present invention relates to an apparatus for damping vibrations, and more particularly, to an apparatus for damping torsional vibrations that occur in a torque transmission process. The apparatus is installed between an end of an engine's crank shaft and a transmission.

BACKGROUND OF THE INVENTION

In general, a dual mass flywheel includes a primary mass and a secondary mass which are relatively rotatable within a limited range and an elastic member for damping the torsional vibrations by being installed between the primary and secondary masses while transmitting a rotational force.

Such dual mass flywheels play a role of damping the torsional vibrations which occur when transmitting torque. The vibrations are caused by a sudden increase or decrease in the number of revolutions of the engine—from the engine to the transmission.

The primary mass engages an output element (for example, the crank shaft) of the engine and the secondary mass engages an input element of the transmission. The secondary mass and an input side of the transmission are engaged and disengaged through a clutch. In general, the primary mass and the secondary mass are connected by means of a spring.

However, it is difficult to obtain optimal damping characteristics using current dual mass flywheels, where the optimal characteristics are based on the torque characteristics for each number of revolutions.

SUMMARY OF THE INVENTION

An exemplary dual mass flywheel useful with the present invention includes a primary mass engagable with a crankshaft. A first drive plate is coupled to said primary mass by disposing a main elastic member therebetween. A pair of second drive plates are coupled to said first drive plate by disposing an idle elastic member therebetween. A secondary mass is fixedly coupled to said pair of second drive plates. The first drive plate has a first main elastic member recess formed in circumferential direction thereof. The dual mass flywheel further comprises a pair of covers enclosing the first drive plate on both sides of said first drive plate and fixedly coupled to said primary mass. The pair of covers each have a second main elastic member recess formed in circumferential direction thereof in a position corresponding to that of said first main elastic member recess of said first drive plate. The main elastic members are inserted into said main elastic member recess of said first drive plate and said second main elastic member recess of each of said covers at the same time so as to be compressed between said covers and said first drive plate.

In addition, the first drive plate has a first stopper recess of arcuate-shape formed in a circumferential direction thereof and having a predetermined width. The dual mass flywheel further comprises a first stopper fixedly coupled between said pair of covers so as to be movable along said first stopper recess.

Further, the first drive plate has a first idle elastic member recess formed in a circumferential direction thereof. The pair of second drive plates each have a second idle elastic member recess formed in a position corresponding to that of said first idle elastic member recess. The idle elastic member is inserted into said first and second idle elastic member recesses at the same time so as to be compressed between said first drive plate and said second drive plates.

The idle elastic member preferably includes: a first idle spring; a pair of spring guides; and a second idle spring arranged between said pair of spring guides so as to elastically support said pair of spring guides.

The first drive plate has a second stopper recess of arcuate-shape formed in a circumferential direction thereof and having a predetermined width. The dual mass flywheel further includes a second stopper fixedly coupled between said pair of second drive plates so as to be movable along said second stopper recess.

A dual mass flywheel according to another embodiment of the present invention includes a primary mass configured to couple with a crankshaft. A secondary mass is coupled so as to be relatively rotatable with respect to said primary mass within a predetermined range. A first drive plate is coupled so as to be relatively rotatable with respect to said primary mass within a predetermined range. A first damping device disposed between said primary mass and said first drive plate. A second drive plate fixedly coupled to said secondary mass and coupled so as to be relatively rotatable with respect to said first drive plate within a predetermined range. A second damping device is disposed between said second drive plate and said first drive plate.

Also, said first drive plate has a first spring recess formed in circumferential direction thereof. The first damping device also includes a pair of covers which are fixedly coupled to said primary mass and which each have a second spring recess formed in a position corresponding to that of said first spring recess, and a main spring which is inserted into said first and second recesses at the same time.

In addition, first drive plate further includes a first stopper recess formed in a circumferential direction thereof. The first damping device further includes a first stopper fixedly coupled between said pair of covers and movably arranged in said first stopper recess. The first drive plate includes a third spring recess formed in a circumferential direction thereof. The second drive plate includes a fourth spring recess formed in a position corresponding to that of said third spring recess. The second damping device includes a first idle spring inserted into said third and fourth spring recesses at the same time, and a second idle spring inserted into said first idle spring and supported at their both sides by means of guides.

The first drive plate further includes a second stopper recess formed in circumferential direction thereof. The dual mass flywheel further includes a second stopper fixedly coupled to said second drive plate and installed to be movable along said second stopper recess.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

A preferred embodiment of the present invention will hereinafter be described in detail with reference to the accompanying drawings.

Figure 1:
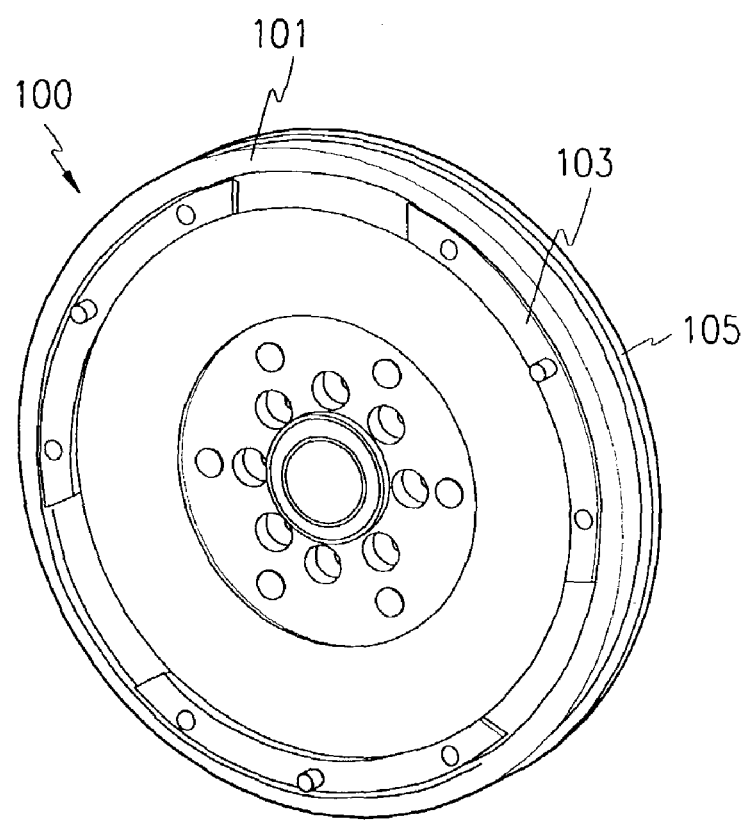
FIG. 1 is a perspective view showing a front side of a dual mass flywheel, according to a preferred embodiment of the present invention.
Figure 2:
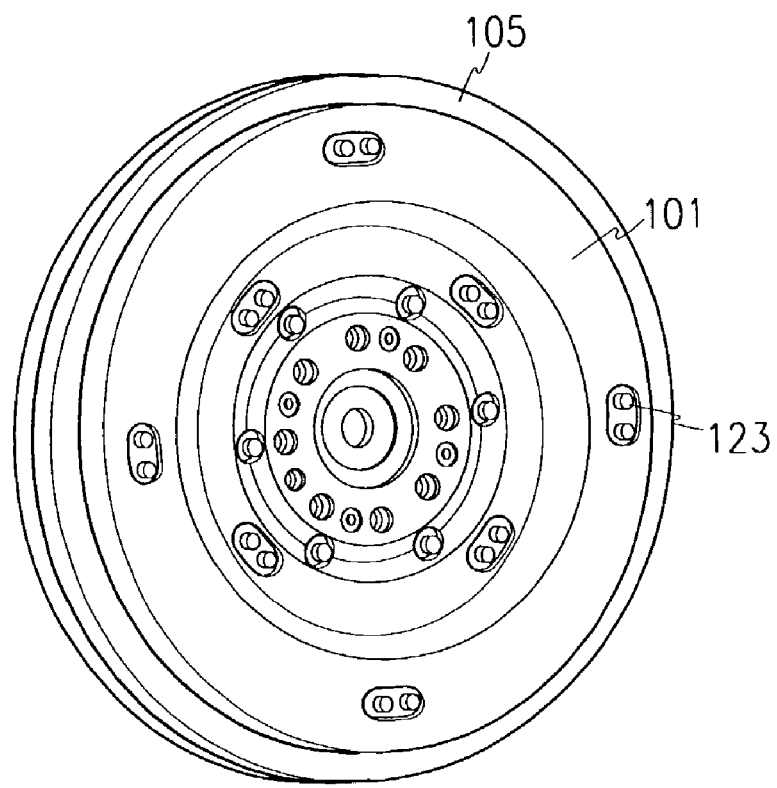
FIG. 2 is a perspective view showing a rear side of a dual mass flywheel according to a preferred embodiment of the present invention.

As shown in FIGS. 1 and 2, a dual mass flywheel 100 according to a preferred embodiment of the present invention includes a primary mass 101 a secondary mass 103, and a ring gear 105 arranged on an outer circumference of the primary mass 101.

Figure 3:
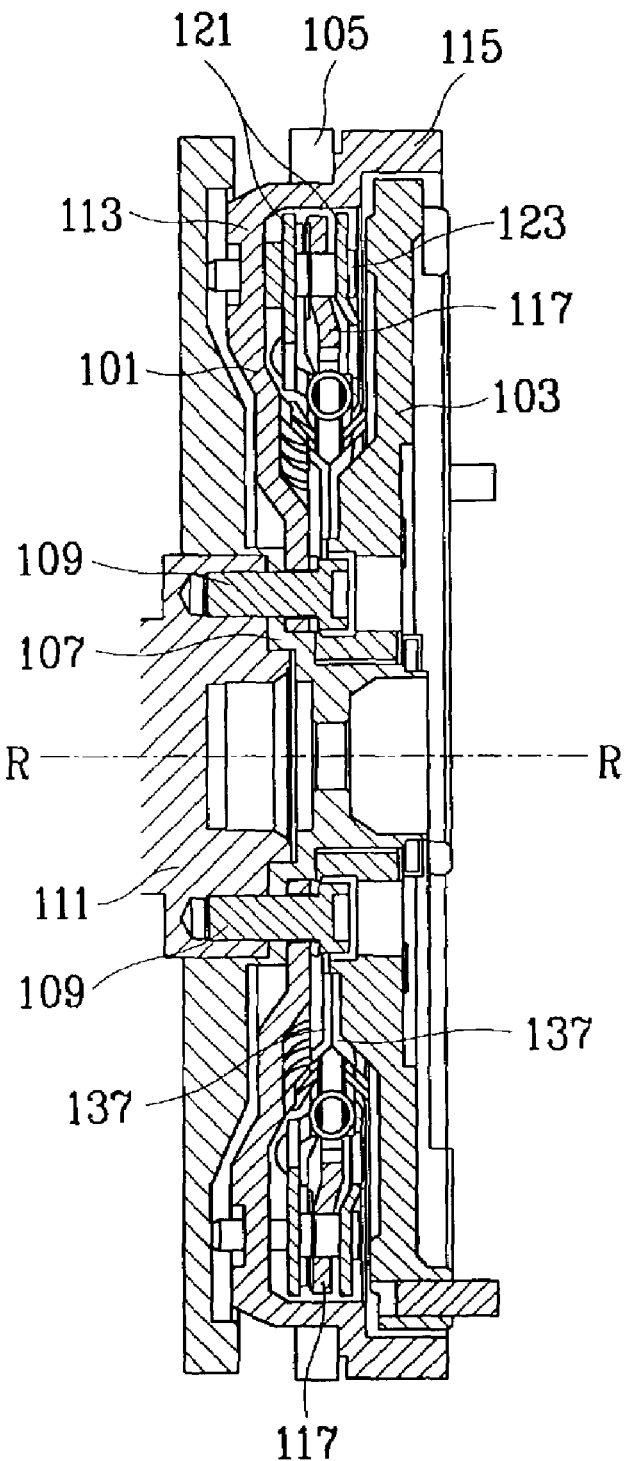
FIG. 3 is a sectional view of the dual mass flywheel according to the preferred embodiment of the present invention.

FIG. 3 is a sectional view showing the internal structure of the dual mass flywheel 100 according to the preferred embodiment of the present invention. The primary mass 101 has a circular through hole at its center part and a hub 107 is inserted into the through hole. The primary mass 101 and the hub 107 are fixedly engaged with an engine crankshaft 111 by means of rivets 109. Therefore, the primary mass 101 and the engine crankshaft 111 rotate around a rotational axis R-R as one piece.

The primary mass 101 has a radially extending body part 113 and a flange part 115 extending in a direction parallel to the rotational axis R-R from a periphery of the body part 113.

Figure 4:
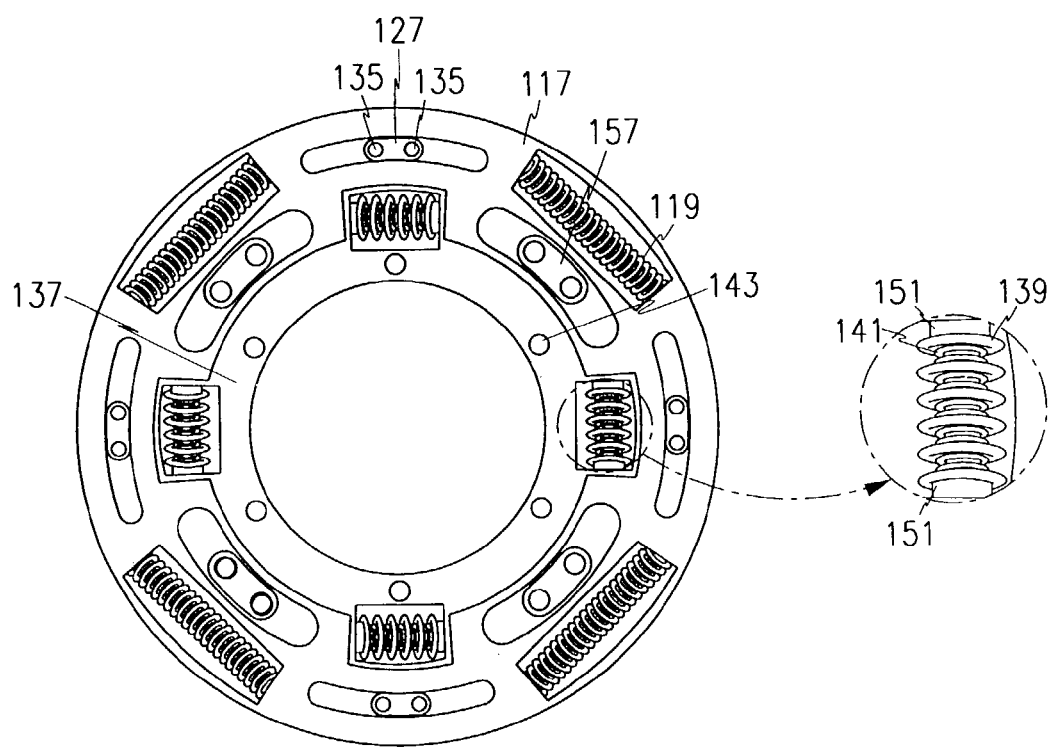
FIG. 4 shows internal structure of the dual mass flywheel according to the preferred embodiment of the present invention.
Figure 6:
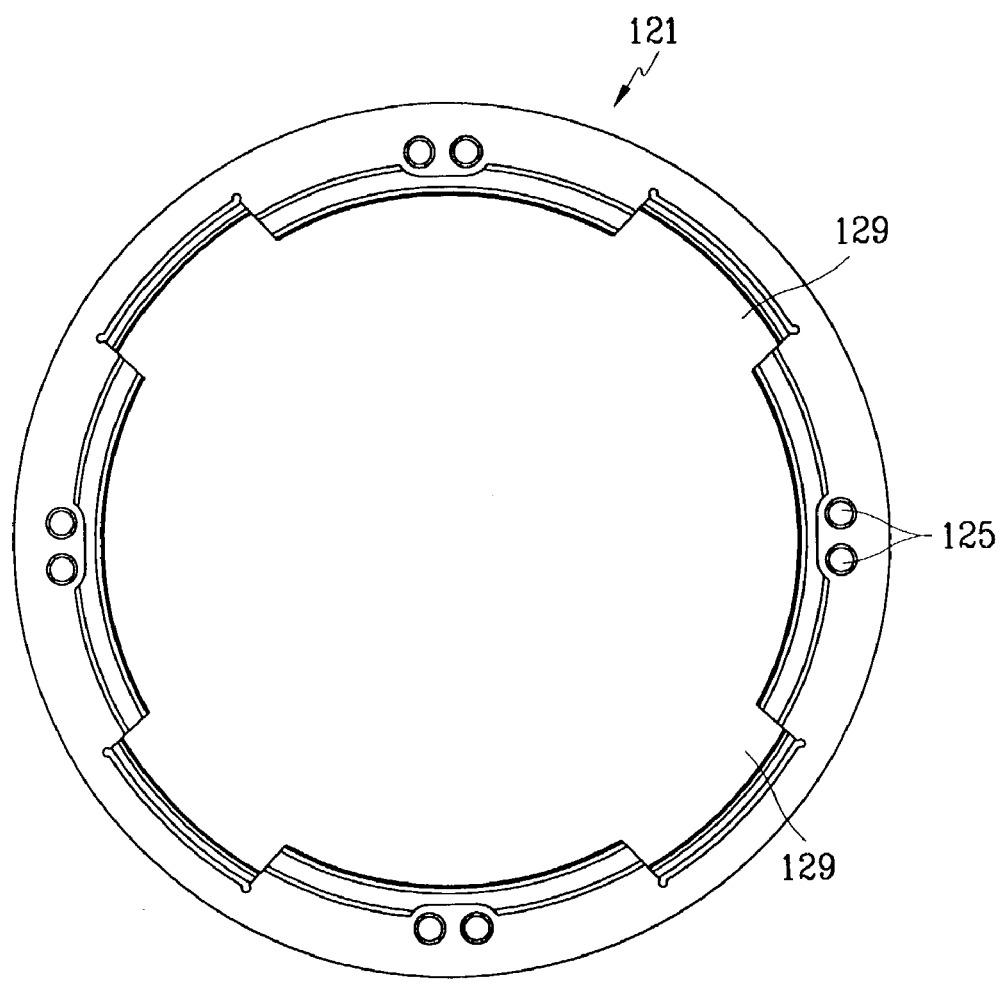

As shown in FIG. 4, the primary mass 101 is connected a first drive plate 117 by disposing therebetween main springs 119 having a spring constant of a predetermined magnitude. The primary mass 101 is fixedly engaged to a pair of covers 121 by means of rivets 123. As shown in FIGS. 4 and 6, the cover 121 is provided with a plurality of rivet holes 125 formed in a circumferential direction thereof. First stoppers 127 are arranged between the rivet holes 125 each facing the other of the pair of covers 121. The first stoppers 127 include rivet holes 135. The rivets 123 are inserted through the rivet holes 125 and 135 so that the first stoppers 127 are fixedly engaged between the pair of covers 121. Although four stoppers 127 are shown in a preferred embodiment of the present invention, it should be appreciated that any suitable number of stoppers may be used.

In addition, as shown in FIG. 6, four recesses 129 are formed in circumferential direction in the cover 121, in which the main springs 119 are arranged. However, it should be apparent that any suitable number of main springs 119 and recesses 129 may be used.

Figure 5:
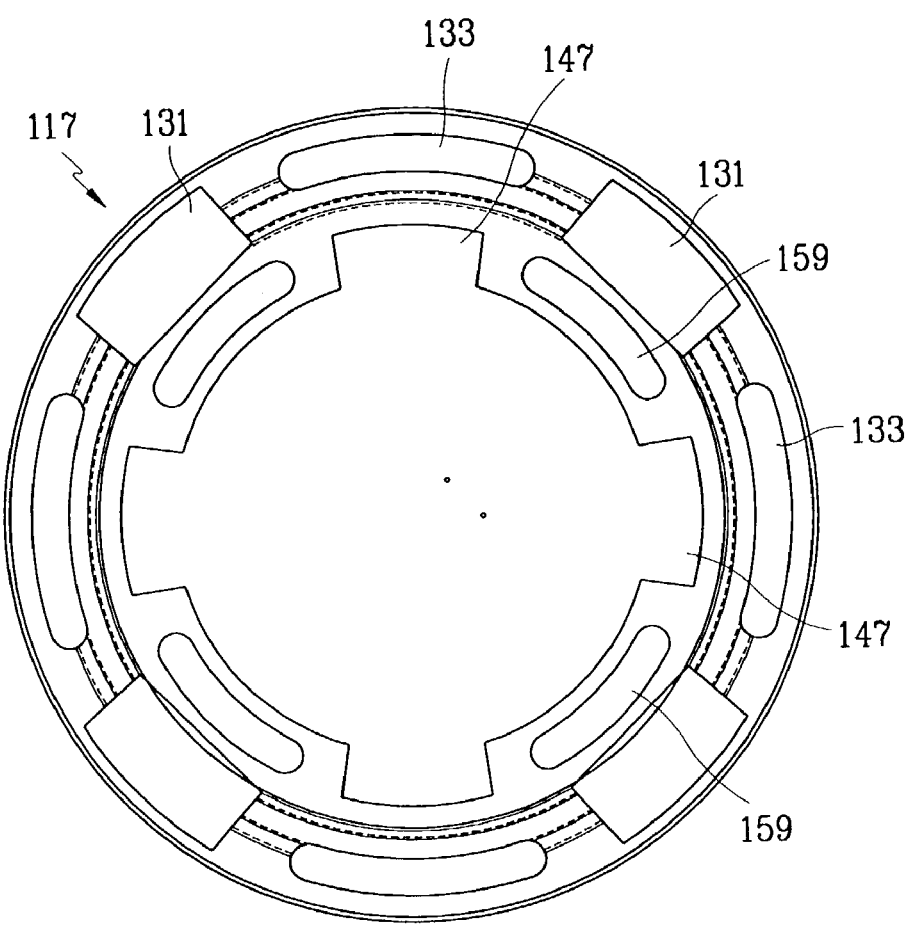
FIGS. 5 to 7 show a first drive plate, a first drive plate cover and a second drive plate of the dual mass flywheel according to the preferred embodiment of the present invention, respectively.

A first drive plate 117 is arranged between the pair of covers 121. As shown in FIGS. 4 and 5, the first drive plate 117 is a circular plate. Spring recesses 131 of predetermined size and stopper recesses 133 of predetermined size are alternatingly formed in a circumferential direction of the first drive plate 117. The spring recesses 131 of the first drive plate 117 and the recesses 129 of the cover 121 are formed in positions corresponding to each other and the main springs 119 are arranged in the two recesses 131 and 129. Also, first stoppers 127 which are fixedly engaged between the covers 121 are movably arranged in the stopper recesses 133 formed in the first drive plate 117.

Since the pair of covers 121 are fixedly coupled to the primary mass 101, where the primary mass 101 rotates, the covers 121 rotate together with the primary mass 101. When the covers 121 rotate, the main springs 119 are compressed and, thereby, transmit a rotational force to the first drive plate 117. At this time, the first stoppers 127 fixedly engaged between the pair of covers 121 are moved along the stopper recesses 133 formed in the first drive plate 117.

If the primary mass 101 and the first drive plate 117 rotate relative to each other and the first stoppers 127 reach an end of the stopper recesses 133, then the primary mass 101 and the first drive plate 117 rotate as one piece. Limiting the stopper recesses 133 to a certain size as described above prevents the main springs 119 from being excessively compressed, thereby avoiding damaging the elastic force of the main springs 119.

A pair of second drive plates 137 are coupled to inside the first drive plate 117 by disposing therebetween first idle springs 139 and second idle springs 141.

Figure 7:
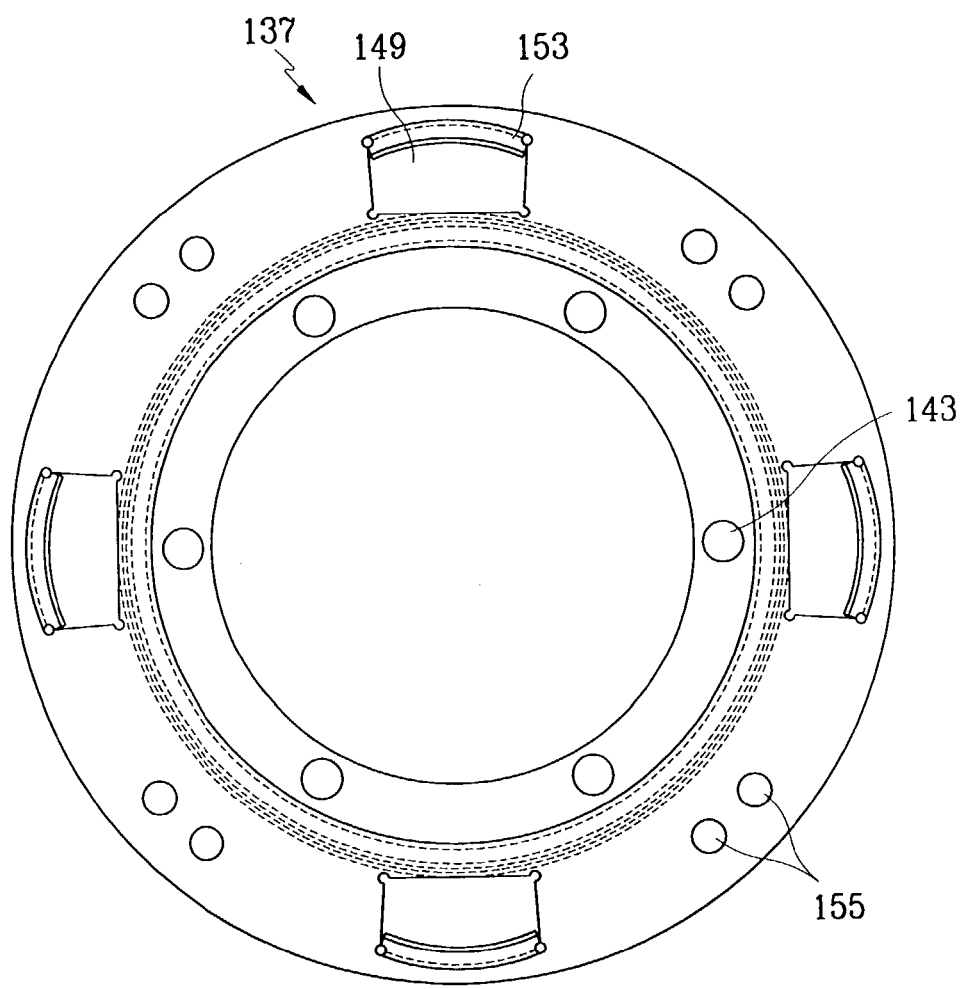

As shown in FIG. 7, the second drive plates 137 have a plurality of rivet holes 143 formed around a circumferential direction thereof. The second drive plates 137 are fixedly coupled to a secondary mass 103 by means of rivets through the rivet holes 143. The secondary mass 103 is coupled rotatably to the hub 107 via a bearing with the primary mass 101

A plurality of idle spring recesses 147 are formed inside the first drive plate 117 in circumferential direction thereof. A plurality of spring recesses 149 are formed in the second drive plate 137 in positions corresponding to the spring recesses 147 of the first drive plate 117. The first idle springs 139 and the second idle springs 141 are arranged in the two spring recesses 147 and 149.

As shown in FIG. 4, the second idle springs 141 are arranged inside the first idle springs 139 and the spring constant of the second idle springs 141 has a value smaller than that of the spring constant of the first idle springs 139. Furthermore, the spring constant of the first idle springs 139 has a value smaller than that of the spring constant of the main springs 119.

Both sides of the second idle springs 141 are supported by means of a pair of idle spring guides 151. That is, the idle spring guides 151 are elastically supported by means of the second idle springs 141 and abut both ends of the two spring recesses 147 and 149.

The length of the first idle springs 139 in their equilibrium state is smaller than width of the two recesses 147 and 149, and the idle spring guides 151 are inserted into both ends of the first idle springs 139. Therefore, if a rotational angle occurs between the first drive plate 117 and the second drive plate 137, the second idle springs 141 are first compressed to a certain degree or more, and thereafter the first idle springs 139 are compressed.

Covers 153 are provided towards the outer side of the spring recesses 149 of the second drive plate 137, extending in a circumferential direction thereof. Open chambers are formed between the covers 153 respectively formed in the recesses 149 of the pair of opposing second drive plates 137. The first idle springs 139 and the second idle springs 141 are arranged in the chambers to prevent them from escaping the recesses 149.

Rivet holes 155 are formed between the spring recesses 149 in circumferential direction of the second drive plates 137. Second stoppers 157 are coupled between the rivet holes 155 facing each of the pair of second drive plates 137. In addition, in the first drive plates 117, stopper recesses 159 are formed in circumferential direction of the first drive plate 117 which have a certain width and are provided in positions corresponding to the second stoppers 157.

When relative rotation occurs between the first drive plate 117 and the second drive plates 137, the second stoppers 157 rotate along the stopper recesses 159. When the relative rotational displacement is increased so that the second stoppers 157 abut an end of the stopper recesses 159, the relative displacement is not further increased and the first drive plate 117 and the second drive plates 137 rotate as one piece.

The dual mass flywheel installed between the crankshaft of the engine and the input side of the transmission transmits a rotational force from the engine to the transmission or vice versa. The dual mass flywheel effectively dampens the torsional vibration generated when transmitting the rotational force.

Where an engine is driven for the first time, or where there is a sudden increase in the rotational speed of the engine, a difference in the rotational speeds between the primary mass 101, coupled to the crankshaft, and the second mass 103, connected to the input side of the transmission, occurs. Accordingly, a difference in rotational speed occurs between the pair of covers 121 fixedly coupled to the primary mass 101 and the first drive plate 117. Consequently, a rotational angle is generated between the covers 121 and the first drive plate 117. The plurality of main springs 119 disposed between the covers 121 and the first drive plate 117 are compressed and the rotational force is transmitted to the first drive plate 117.

When the first drive plate 117 rotates, the second idle springs 141 disposed between the first drive plate 117 and the second drive plates 137 are first compressed to transmit the rotational force to the second drive plates 137. When the second idle springs 141 are compressed to a certain degree, the first idle springs 139 start to be compressed to transmit the rotational force to the second drive plates 137 and eventually to the secondary mass 103 fixedly engaged with the second drive plates 137. At this time, the second idle springs 141 having smaller spring constant are first compressed and then the first idle springs 139 are compressed, thereby obtaining a stepwise damping effect.

As described above, the dual mass flywheel according to the preferred embodiment of the present invention can efficiently perform damping so as to efficiently prevent a rattle noise or a booming phenomenon of the transmission. In addition, such a dual mass-flywheel can obtain a stepwise damping effect by means of the main springs and the first and second idle springs, even in the case of sudden torque changes.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A dual mass flywheel comprising:
a primary mass configured to couple to a crankshaft;
a first drive plate coupled to said primary mass by disposing a main elastic member therebetween;
a pair of second drive plates coupled to said first drive plate by disposing an idle elastic member therebetween; and
a secondary mass fixedly coupled to said pair of second drive plates, wherein:
said first drive plate has a first idle elastic member recess formed in a circumferential direction thereof;
said pair of second drive plates each having a second idle elastic member recess formed in a position corresponding to that of said first idle elastic member recess; and
said idle elastic member is inserted into said first and second idle elastic member recesses at the same time so as to be compressed between said first drive plate and said second drive plates, wherein said idle elastic member comprises:
a first idle spring;
a pair of spring guides; and
a second idle spring arranged between said pair of spring guides so as to elastically support said pair of spring guides.

2. The dual mass flywheel of claim 1 wherein a spring constant of said first idle spring is larger than that of said second idle spring.

3. A dual mass flywheel comprising:
a primary mass coupled to a crankshaft;
a secondary mass coupled so as to be relatively rotatable with respect to said primary mass within a predetermined range;
a first drive plate coupled so as to be relatively rotatable with respect to said primary mass within a predetermined range;
a first damping device disposed between said primary mass and said first drive plate;
a second drive plate fixedly coupled to said secondary mass and coupled so as to be relatively rotatable with respect to said first drive plate within a predetermined range; and
a second damping device disposed between said second drive plate and said first drive plate, wherein
said first drive plate includes a third spring recess formed in circumferential direction thereof;
said second drive plate includes a fourth spring recess formed in a position corresponding to that of said third spring recess; and
said second damping device includes a first idle spring inserted into said third and fourth spring recesses at the same time, and a second idle spring inserted into said first idle spring and supported at their both sides by means of guides.

4. The dual mass flywheel of claim 3 wherein
said first drive plate further includes a second stopper recess formed in circumferential direction thereof; and
said dual mass flywheel further includes a second stopper fixedly coupled to said second drive plate and installed to be movable along said second stopper recess.

5. A dual mass flywheel comprising:
a primary mass configured to couple to a crankshaft;
a first drive plate coupled to said primary mass by disposing a main elastic member therebetween;
a pair of second drive plates coupled to said first drive plate by disposing an idle elastic member therebetween; and
a secondary mass fixedly coupled to said pair of second drive plates, wherein said first drive plate has a first idle elastic member recess formed in about a circumference thereof;
said pair of second drive plates each have a second idle elastic member recess formed in a position corresponding to that of said first idle elastic member recess; and
said idle elastic member is inserted into said first and second idle elastic member recesses to be compressed between said first drive plate and said second drive plates, wherein said idle elastic member comprises:

a first idle spring;

a pair of spring guides; and a second idle spring arranged between said pair of spring guides to elastically support said pair of spring guides.

6. The dual mass flywheel of claim 5 wherein a spring constant of said first idle spring is larger than that of said second idle spring.

7. The dual mass flywheel of claim 5 further comprising a second stopper fixedly coupled between said pair of second drive plates, wherein said first drive plate has a second stopper recess of arcuate shape formed about a circumference thereof and having a predetermined width, and said second stopper is arranged to be movable about a circumference of said first drive plate in said second stopper recess.

8. A dual mass flywheel comprising:

a primary mass configured to couple to a crankshaft;

a secondary mass rotatably coupled to a primary mass, and rotatable within a predetermined range;

a first drive plate rotatably coupled to said primary mass, and rotatable within a predetermined range;

a first damping device disposed between said primary mass and said first drive plate;

a second drive plate fixedly coupled to said secondary mass and rotatably coupled to said first drive plate, and rotatable within a predetermined range; and a second damping device disposed between said second drive plate and said first drive plate, wherein said first drive plate includes a third spring recess formed about a circumference thereof;

said second drive plate includes a fourth spring recess formed in a position corresponding to that of said third spring recess; and said second damping device includes a first idle spring simultaneously inserted into said third and fourth spring recesses, and a second idle spring inserted into said first idle spring and supported at both sides by means of guides.

9. The dual mass flywheel of claim 8 wherein said first drive plate further includes a second stopper recess formed about a circumference thereof; and said dual mass flywheel further includes a second stopper fixedly engaged with said second drive plate and movable along said second stopper recess.

* * * * *